United States Patent [19]

Seiling

[11] Patent Number: 4,630,930
[45] Date of Patent: Dec. 23, 1986

[54] HIGH SPEED BATCH MIXER
[75] Inventor: Samuel O. Seiling, Richmond, Va.
[73] Assignee: AMF Union Machinery Inc., Richmond, Va.
[21] Appl. No.: 646,410
[22] Filed: Sep. 4, 1984
[51] Int. Cl.[4] .............................. B28C 7/16; A21C 1/00
[52] U.S. Cl. ................................... 366/77; 366/91; 366/99; 366/189; 366/194; 366/290; 366/310
[58] Field of Search ............... 366/14, 15, 69, 70, 366/84, 86, 91, 189, 193, 279, 290, 291, 295, 310, 329, 77, 192, 99, 194–196; 222/281; 425/239

[56] References Cited
U.S. PATENT DOCUMENTS

| | | | |
|---|---|---|---|
| 1,380,632 | 6/1921 | Bowden | 366/71 |
| 3,326,144 | 6/1967 | Palmer | 222/281 |
| 3,606,271 | 9/1971 | Schmidt | 366/142 |
| 3,752,448 | 8/1973 | Madonia | 366/70 |
| 4,010,932 | 3/1977 | Otto | 366/77 |
| 4,490,046 | 12/1984 | Guibert | 366/91 |

Primary Examiner—Timothy F. Simone
Attorney, Agent, or Firm—Willian Brinks Olds Hofer Gilson & Lione

[57] ABSTRACT

A dough batch mixing process and apparatus where the ingredients are mixed first at a high rate of speed and then transferred for developing in a separate chamber. The blending of ingredients is performed by a helical shaped agitator without a central shaft which rotates to force the mix toward one end of the chamber. A common hatchway between the chambers is opened and the agitator spirals to force the mix through the opening into the second chamber for further development of the mix. After completion of the developing cycle, the fully prepared dough is exhausted from the chamber by two rotating roller bars which substantially pulls the entire mass from the chamber leaving limited waste behind. Each segment of the cycle is performed continuously so that a new fully developed dough batch is readied every one-half cycle time.

10 Claims, 5 Drawing Figures

HIGH SPEED BATCH MIXER

This invention relates to a process and apparatus for the preparation of bread dough and the like. It further relates to the preparation of a dough mix by blending the ingredients and developing the final dough product in separate chambers under separate mixing speeds and conditions. This application also relates to a method and apparatus whereby a batch mix is shifted from step to step substantially without the use of separate transfer equipment or gravitational dumping. The net result of this invention is to decrease the overall mixing time, diminish the labor required for transfer and cleaning and increase the transfer efficiency while producing a final product of consistent quality.

BACKGROUND OF THE INVENTION

In the art of preparing a mix for bakery doughs, it is known to differentiate certain portions of the process in order to obtain a better grade of final product. Also, certain variations in the dough recipes have been made whereby the substitution for or addition of certain ingredients has allowed for an increase in the speed of the mixing process without diminishing the final product quality.

One method of preparing bread dough is to separate the blending of ingredients, which may be performed at a high rate of speed, from the development of the mixture into dough consistency, which may be accomplished while agitating at a less vigorous rate. The mechanics of performing a two-step mixing process has previously been accomplished by utilizing separate mixing bowls. A mix would be transferred from one mixing bowl to the other by unloading the mix from the bowl into a transfer mechanism and then reloading into the second bowl, or by mounting the bowls above one another and dumping each batch from bowl to bowl utilizing gravitational forces. All of the above methods require significant transfer time, thus adding to the overall batch time, and affect the quality of the final dough product.

Standard exhaust or discharging procedure from a developing mechanism is performed by dumping the final product utilizing gravitational forces. Since the dough is in a highly viscous form after being fully developed, it adheres to the agitators and the side walls of this mechanism making dumping difficult. The slow movement of the dough mass required additional agitation of the beaters and causes significant time delays. Also, the waste material remaining in the bowl after dumping must eventually be removed by cleaning the structure.

It is the object of this invention to fully develop a batch mix in a two-stage process and to limit the overall amount of mixing time for each batch. It is a further object of this invention to transfer a blended batch mix directly to the developing chamber quickly and efficiently without the necessity of mounting separate pieces of machinery above one another in a bakery.

Further, it is an object of this invention to prepare a full batch in a minimum amount of time while producing a consistent quality mixture. A batch is prepared by blending the ingredients readying them for developing, and developing a second dough mix at the same time. All functions are performed by utilizing a unitary structure with interactive segments such that the batch preparation approaches a continuously producing process. This objective is to be achieved while fulfilling the further objective of reducing the size of the mixer machinery.

It is also the object of this invention to provide a quick and efficient exhaust system for all stages of processing a dough batch while leaving a minimum amount of wasted product in the chamber.

In summary, the invention is a semi-continuous dough mixing process where a batch of ingredients is blended in a first chamber by a helical agitator. The agitator is such that its spiral motion causes the ingredients to move internally towards one end of the chamber. Upon complete mixing of the ingredients a hatch is opened and the agitator rotation causes the mix to move through the hatch and into an adjacent second chamber. The hatch is closed and a new batch of ingredients can be prepared. The mix in the second chamber is developed by the kneading action of a developing agitator. Upon full development the dough is exhausted or discharged by a roller structure which pulls the dough completely from the chamber leaving a minimum of waste material behind. The second mix can now be moved into the second chamber and a third batch started.

Further advantages will be seen by describing the preferred embodiment and setting forth claims for the invention.

DETAILED DESCRIPTION

Figure 1:
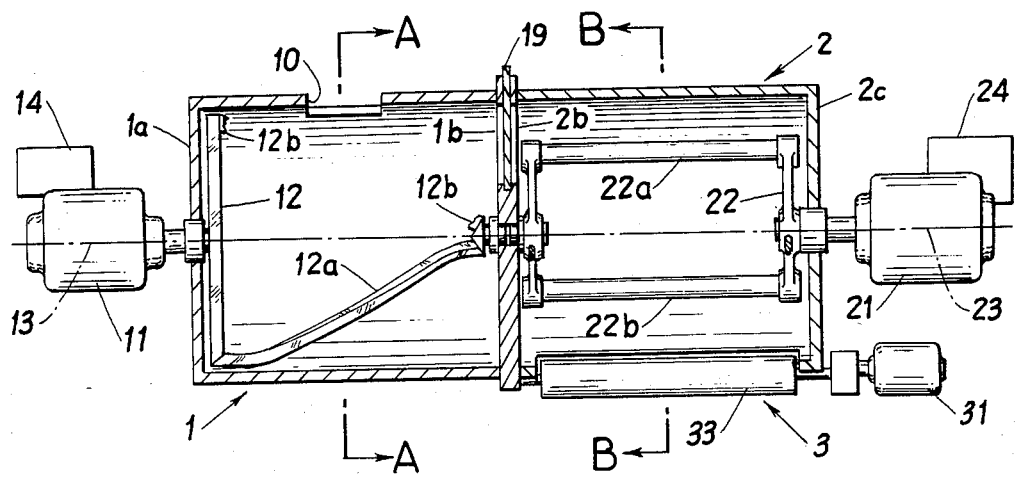
FIG. 1 is a cross sectional view of the entire batch mixer showing its interior structure.

In a preferred embodiment of the invention, three functions cooperate to produce a single dough batch, these segments are designated in FIG. 1 as the blending chamber 1, the developing chamber 2 and the exhaust rollers 3. The invention is illustrated as a unitary machine, with each designated functional unit operating in a chronological order to produce a single dough batch. Each segment may operate independently of the other so that the process is continually preparing a new dough batch.

The blending chamber 1 is of a substantially circular cross-section with flat walls at either end 1a, 1b. This chamber has an inlet 10 for adding the ingredients. This inlet 10 can be located at any convenient position in order to effectively allow for the addition of the mix ingredients. Positioning is dependent on the size of the overall machine and its intended location within a bakery. As shown, the inlet is placed at the top of the blending chamber 1 so that special gaskets are not required to avoid leaking during mixing.

Within the blending chamber 1 is an agitator 12 having at least two blades 12a, 12b of substantially helical shape mounted to rotate about the horizontal axis 13 of the blending chamber 1. The agitator blades 12a, 12b are mounted without a center shaft and form a double helix which rotates adjacent to the periphery of the blending chamber 1. The motion of the agitator blades 12a, 12b moves all the ingredients in the chamber toward one wall of the chamber 1a or 1b depending on the agitator's 12 direction of rotation.

A means for rotation 11 of the blending agitator 12 is provided and is typically an electric motor. Control 14 of the cycle for this chamber can be responsive to either time lapse or to the motor energy usage level.

Figure 2:
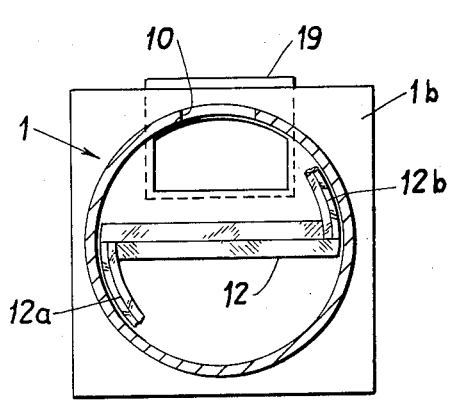
FIG. 2 is a cross section of the blending chamber along line A—A as viewed in the direction of the arrows.

The structure of the blades 12a and 12b of the agitator are such that a flat surface rotates adjacent to the circumference of the interior of the blending chamber. The cross section of the blades is either triangular (see FIG. 2) or rectangular (not shown) such that upon rotation of the blades 12a and 12b the ingredients are directed away from the circumference of the blending chamber. The slope of the helix controls the lateral movement of the ingredients in the chamber. The preferred slope of the helix is such that the blades 12a and 12b are angled at approximately 45 degrees from the horizontal at all points along its length.

An exit hatchway 19 is provided on one wall 1b of the chamber. This hatchway is preferably located in the upper quadrant of the chamber wall 1b so that the added water or the blending mix will not leak into the developing side of the apparatus. Depending on the desires of the manufacturer or purchaser the agitator 12 can be run to force the ingredients: (a) toward the opposite wall 1a from the hatchway 19 and then reversing direction of rotation to discharge the dough while being forced toward the opposite wall (this method requiring a reversible type rotation means 11), or (b) towards the closed hatchway 19 during blending and upon opening the hatchway 19 the rotating agitator 12 effectuates the discharge through the hatchway 19 (this method requiring a seal on the hatchway to prevent leakage during the blending cycle). The helix of the blending agitator 12 forces the mix in a single direction. When the hatchway 19 is opened and the agitator is rotated, the mix is forced towards the wall 1b, up and through the hatchway. The dough movement is quick and substantially all the dough is removed immediately from the blending chamber 1 into the developing chamber 2.

The developing chamber 2 is positioned with one wall 2b adjoining the blending hatchway 19 and blending chamber wall 1b such that the hatchway is a common inlet/outlet between the two chambers. This developing chamber 2 has a substantially circular cross section which encloses the chamber work space. The developing agitator 22 is comprised of a plurality bars (three being shown in the drawings) 22a, 22b and 22c which are mounted parallel to each other and substantially parallel to the horizontal axis 23 of the developing chamber 2 about which they rotate. The design of the developing agitation bars 22a, 22b, and 22c is preferably of a concave-convex configuration so that a good end-to-end kneading action is obtained.

The developing agitator drive means 21 has a control means 24 which can cycle according to either time lapse or the level of motor energy usage.

Figure 3:
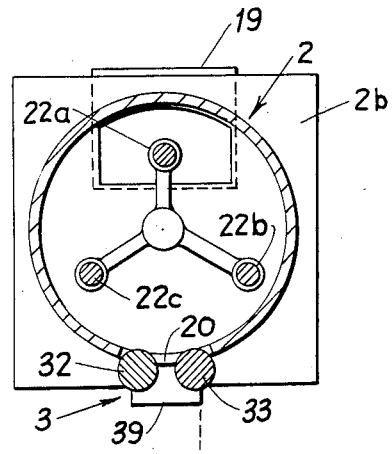
FIG. 3 is a cross section of the developing chamber along line B—B as viewed in the direction of the arrow.
Figure 4:
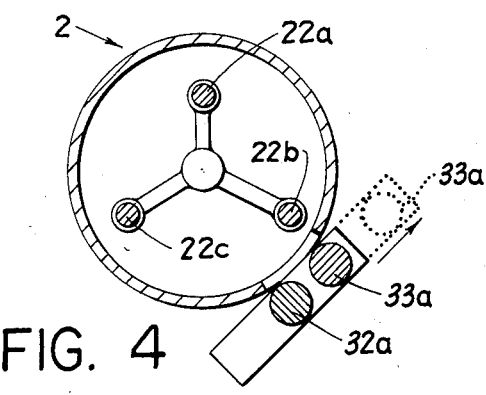
FIGS. 4 and 5 are alternative designs of the developing chamber showing various exhaust mechanism locations.
Figure 5:
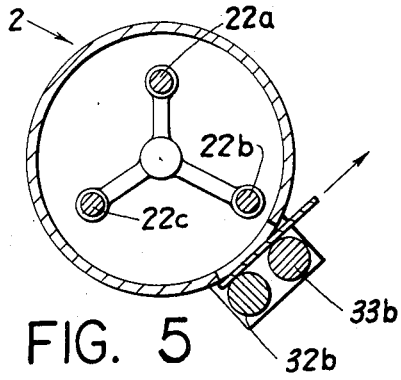

The exhaust discharge means 3 for the developing chamber 2 can be mounted at numerous locations on the structure of the developing chamber 2 depending on this structure (FIGS. 3, 4 and 5). The exhaust means 3 consists generally of two rollers 32 and 33 mounted in close proximity which rotate in opposite directions. Upon rotation the dough is pulled through the space 20 between the rollers 32, 33. The rollers 32, 33 have a drive means 31 and a hatch 39 may be used to close space 20 during the development agitation of the batch prior to its exhaust.

FIGS. 3, 4 and 5 show three different locations for mounting the exhaust mechanism. FIG. 3 shows the rollers 32, 33 positioned to assist in vertically dumping the developed mix from this type developing mechanism. FIGS. 4 and 5 show the rollers 32a, 33a or 32b, 33b (respectively) mounted on a side dumping hatch such that the dough will be pulled in a horizontal direction out of the developing chamber. Each of these configurations could be adapted for use on any conventional developing machine. The device requires that it be moved into position at the time of discharge to effectuate exhaust of the dough. The overall effect is to remove operator skill from the exhaust process and this operation could be easily automated by a suitable means (24).

Both the developing chamber and the blending chamber must be provided with a hatch suitable for access to effectuate cleaning. Preferably, this hatch comprises a portion of the chamber which can be hinged to the body of the chamber. Both chambers should be jacketed with an insulating material and cooled to give better control over the final product temperature.

DESCRIPTION OF THE PROCESS

The process for preparing a completed dough batch is accomplished by first adding the desired ingredients into the blending chamber 1. Any normal recipe or mixture can be utilized. Dry ingredients can be added first and thoroughly mixed by running the agitator. Proper moisture can be added to complete the mix. The agitator 12 runs at approximately 350 RPM. The helical design forces all the ingredients to one end of the chamber, blending it into a consistent mass. After the ingredients are properly blended, determined by measuring either the running time for the motor 11 or the energy usage by the motor, the agitator 12 is stopped. The common hatchway 19 is opened and the agitator 12 is run such that the dough is forced towards the hatchway 19 into the developing chamber. The agitator causes the entire mass to quickly move through the hatchway. The hatchway is then closed and a new mix can be added for blending in the chamber 1.

Once the mixed batch is in the developing chamber 2, the developing agitator 22 is rotated at approximately 100 RPM. The dough is fully developed, again indicated by time lapse or by energy usage, and the bottom hatch 39 is opened. The rotating rollers 32, 33 substantially pull the entire dough mass from the chamber 2. The fully developed mix is ready for the next baking step and the newly blended mix can be transferred into the now empty blending chamber 2.

What is claimed is:

1. A semi-continuous batch mixing apparatus for mixing and developing bakery dough comprising:
   a cylindrical blending chamber for mixing a batch of bakery dough ingredients, said blending chamber having a substantially horizontal central longitudinal axis;
   a helical agitator mounted for rotation about the central longitudinal axis of said blending chamber,
   said helical agitator having a plurality of blades for rotation adjacent to the circumference of the interior of said blending chamber, each said blade having an angled slope with respect to the horizontal at substantially each point along said blade and having a cross section with a flat side moving adjacent to said blending chamber's circumferential wall such that upon rotation of said blades the batch ingredients are mixed by driving the ingredients towards one lateral end of said blending chamber;

means for rotating said helical agitator;

inlet means into said blending chamber for introduction of a batch of dough ingredients from the top of said blending chamber, said inlet means being sealed when closed to prevent leakage of the batch ingredients during agitation:

a selectively closable outlet hatchway located at the lateral end of said blending chamber in the direction of movement of the batch ingredients, said hatchway being located above the central longitudinal axis of said blending chamber, and being sealed when closed such that leakage is prevented from said blending chamber during agitation and upon opening said hatchway the batch ingredients are moved through the opening by the rotation of said helical agitator and out of said blending chamber;

a cylindrical developing chamber for developing the mixed batch of ingredients into a proper consistency mounted horizontally adjacent to said hatchway on said blending chamber for receiving the mixed batch of ingredients, said developing chamber having a substantially horizontal central longitudinal axis;

a developing agitator mounted for rotation within said developing chamber about an axis substantially in line with the central longitudina axis of said blending chamber, said developing agitator having a plurality of bars mounted for rotation concentrically about the axis of said developing agitator;

means for rotating said developing agitator;

two exhaust rollers mounted adjacent to each other on the periphery of said developing chamber below the central longitudinal axis of said developing chamber providing a discharge means for a fully developed batch of dough; and means for rotating said rollers such that the developed dough is pulled through the nip of said rollers and out of said developing chamber upon the batch being fully developed into a proper consistency by said rotating developing agitator.

2. Apparatus for the semi-continuous batch mixing and developing of bakery dough, comprising the combination of a blending chamber for mixing the batch ingredients, agitator means within the blending chamber and rotatable about a horizontal axis for blending the batch ingredients, a developing chamber separate and distinct from the blending chamber and positioned horizontally in end-to-end relationship therewith, said two chambers having adjacent end walls, selectively closable hatchway means in said adjacent end walls of the two chambers for separating said two chambers when closed, and when open, permitting a blended batch of ingredients to pass from one end of the blending chamber into the adjacent end of the developing chamber, developing agitator means in the developing chamber and rotatable about a horizontal axis, said developing agitator means being positioned to receive blended ingredients that pass through the hatchway means from the blending chamber to thereby knead the dough to a desired consistency, and means for discharging the kneaded dough from the developing chamber after it has reached said desired consistency.

3. The combination claimed in claim 2 and including means for controllably rotating the agitator means in said blending chamber, and separate means for controllably rotating the developing agitator means, whereby the blending chamber and its agitator may blend one batch of dough while the developing chamber and its agitator may simultaneously knead a separate batch of dough.

4. The combination claimed in claim 3 wherein said agitator means in the blending chamber is a double helix configuration.

5. The combination claimed in claim 4 wherein the means for rotating the double helix agitator in the blending chamber can selectively rotate the agitator in opposite directions, wherein rotation of the double helix agitator in one direction moves the ingredients transversely to the direction of rotation and toward said hatchway means at one end of the blending chamber, and rotation in the opposite direction moves the ingredients toward the opposite end of the blending chamber.

6. The combination claimed in claim 2 wherein said means for exhausting the kneaded dough from the developing chamber comprises a dough dumping hatch in said developing chamber through which dough may be discharged from the chamber, a pair of spaced rotating rollers spanning the exterior of said dumping hatch, said rollers being rotatable in opposite directions to engage and move dough passing from the developing chamber through the dumping hatch, and means for selectively controlling the passage of dough through the dumping hatch.

7. A semi-continuous process for batch mixing and developing of bakery dough, comprising the steps inserting a first batch of dough ingredients into a blending chamber and blending the ingredients therein by actuation to produce a first batch of bakery dough, horizontally transferring substantially the entire first batch of dough from the blending chamber through a hatchway in one end wall thereof directly into an end of an adjacent independent developing chamber, developing the transferred first batch of dough by kneading it within the developing chamber, while said first batch of dough is developing in the developing chamber, introducing a second batch of dough ingredients into the blending chamber and blending them into a second batch of dough independently of and separate from the kneading of the first batch in the developing chamber, discharging substantially completely the first batch of dough from the developing chamber while the second batch is maintained as a separate and distinct batch in the blending chamber, and horizontally transferring substantially completely the second batch of dough from the blending chamber directly into the substantially empty adjacent developing chamber.

8. The semi-continuous process for batch mixing and developing bakery dough claimed in claim 7 wherein the steps of transferring batches of dough from the blending chamber to the developing chamber includes agitating a batch of dough with a helical motion about a horizontal axis through the hatchway between the end of the blending chamber into an adjacent end of the developing chamber.

9. In the method of development of bakery dough, the steps of
- kneading a batch of mixed dough in an independent developing chamber by rotating the dough on an agitator that rotates about a horizontal axis, said rotating agitator tending to force the dough to the periphery of the chamber,
- urging said dough, by means of said agitator, against the periphery of said developing chamber where a selectively closable dough discharge means is located,
- engaging the dough that passes through the open discharge means between a pair of oppositely rotating spaced rollers that are disposed on the exterior of said chamber, whereby the rotating rollers withdraw developed dough from the chamber, and
- continuing the rotation of said agitator as the rollers withdraw the dough from the chamber.

10. In apparatus for the preparation of bakery dough wherein the apparatus includes a developing chamber for developing mixed bakery dough, and further includes improved dough discharge means, the combination comprising
- a developing chamber having an agitator that rotates about a horizontal axis and forces developing dough to the periphery of the chamber,
- selectively closable dough discharge means in the periphery of the chamber against which dough is urged by said agitator, and
- a pair of oppositely rotatable spaced rollers disposed on the exterior of said chamber adjacent the discharge means to engage dough that passes through said discharge means when open and to pull from the chamber developed dough urged to said discharge means by the agitator.

* * * * *